(No Model.)

C. K. PICKLES.
AUTOMATIC BRAKE.

No. 451,899. Patented May 5, 1891.

Witnesses:

Inventor:
Chas. K. Pickles,
By Fowler & Fowler
Attorneys

UNITED STATES PATENT OFFICE.

CHARLES K. PICKLES, OF ST. LOUIS, MISSOURI, ASSIGNOR, BY MESNE ASSIGN-MENTS, TO THE LANSBERG BRAKE COMPANY, OF EAST ST. LOUIS, ILLINOIS.

AUTOMATIC BRAKE.

SPECIFICATION forming part of Letters Patent No. 451,899, dated May 5, 1891.

Application filed April 29, 1890. Serial No. 349,931. (No model.)

*To all whom it may concern:*

Be it known that I, CHARLES K. PICKLES, a citizen of the United States, residing at St. Louis, in the State of Missouri, have invented a certain new and useful Fluid-Pressure Automatic Brake Mechanism, of which the following is such a full, clear, and exact description as will enable any one skilled in the art to which it appertains to make and use the same, reference being had to the accompanying drawings, forming part of this specification.

The present invention relates to novel devices to be used in connection with a fluid-pressure automatic brake mechanism, whereby emergency stops can be made; and the said invention is to be used with such mechanism in which an auxiliary reservoir is employed to store compressed air or other fluid, which is admitted by the operation of the said fluid-pressure brake mechanism to the brake-cylinder to put on the brakes for service stops, and which when the auxiliary reservoir and the train-pipe are both to be put in communication with the brake-cylinder by operating the fluid-pressure brake mechanism for that purpose controls my novel form of valve devices and produces an emergency stop.

The object of the invention is to simpify and render more reliable the valve devices which produce emergency stops.

The invention will best be understood by referring to the accompanying drawings, in which—

Figure 1:
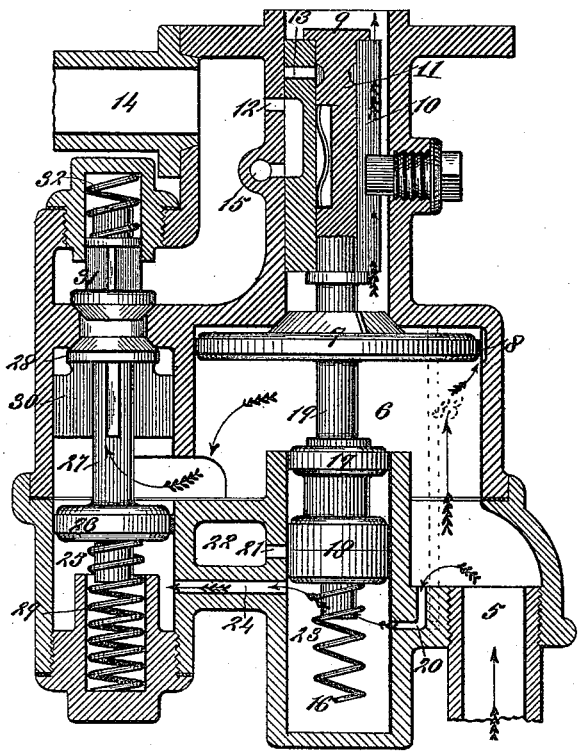
Figure 2:
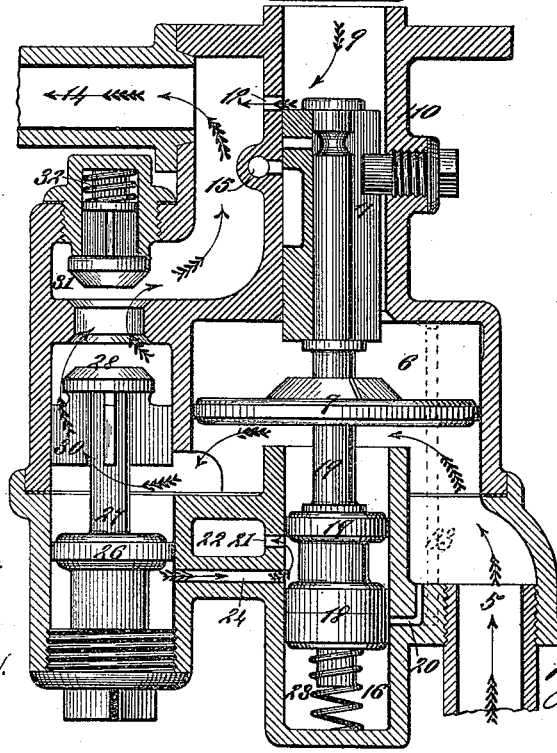

Figure 1 is a vertical section of one form of apparatus made in accordance with my invention, showing the parts in their normal position. Fig. 2 is a view of the same, showing the position of parts when an emergency stop is made.

The same figures of reference indicate the same parts in the different views.

5 is the train-pipe, by which compressed air is conveyed from the air-pump mechanism on the locomotive to the apparatus.

6 is the chamber of the main piston-valve 7, which is of the ordinary construction, and has a port 8 at the limit of its stroke, whereby air is admitted from the train-pipe through the main chamber 6 and port 8 to the auxiliary reservoir connected with the apparatus at 9. The air passes through a short section of pipe 10, in which is arranged a slide-valve 11 of the ordinary construction connected to the main valve. This valve controls a port 12, by which when a port 13 of said valve registers with the same admits the compressed air from the auxiliary reservoir to the brake-cylinder, which is connected to the valve mechanism by a pipe 14. The valve 11 may also connect the port 12 with an exhaust-port 15 to exhaust the air from the brake-cylinder and take off the brakes when said valve resumes its normal position.

The foregoing parts are all well known and form no part of my invention. These said foregoing parts, when operated in the customary way, put on the brakes for ordinary service stops. This is accomplished by the engineer slightly reducing the pressure in the train-pipe 5 by allowing air to escape from said pipe, or in any suitable way which causes the main piston-valve 7 to recede from the position shown in Fig. 1 and causes the port 13, which is in communication with the auxiliary reservoir, to register with the port 12 and put said auxiliary reservoir in communication with the brake-cylinders through the pipe 14, and thus puts on the brakes. The engineer then allows or causes the pressure to resume its normal value in the train-pipe 5 and main chamber 6, which forces the piston-valve 7 to its normal position, closes communication between the ports 12 and 13, and opens communication between the port 12 and the exhaust-port 15, and thus exhausts the air from the brake-cylinders and takes off the brakes. As soon as the piston-valve 7 resumes its normal position air passes from the train-pipe through the main chamber 6, *via* the port 8, through the pipe 10, over the valve 11 to the auxiliary reservoir, and replenishes the same with compressed air. It will be noted that as soon as the piston-valve 7 leaves its normal position it closes the port 8, and thus prevents the air in the auxiliary reservoir from passing back through the port 8 when the pressure in the train-pipe is reduced to put on the brakes. So, also, when the piston-valve 7 is away from its normal position, and the pressure in the train-pipe is brought back to its original pressure, said piston-valve will be forced to its normal position as the port 8 is closed, and the air cannot escape through said valve until said port is open. The movement of the piston-valve 7 to its normal position cuts off communication between the ports 12 and 13 and opens communication between the port 12 and the exhaust-port 15, and thus takes off the brakes. This is the usual operation of automatic fluid-pressure brakes that are now in use, and gives the ordinary service stops.

It is often desirable to have a means whereby an emergency stop can be made—such, for instance, as when the train has parted or there is any obstruction on the road, and it is required to put down the brakes at once throughout the whole train. To effect this purpose I provide a second chamber 16, in which works a valve made up of two pistons 17 and 18, arranged upon a stem 19, connected directly with the main piston-valve 7, and really forms a part thereof and may be considered itself as the main valve. This chamber 16 is in communication with the train-pipe by means of a port or passage-way 20, and has also a port 21, controlled by the piston 18, the said port 21 communicating with an exhaust 22. The pistons 17 and 18 are provided with a spring 23 connected thereto at one end, the other end of which spring is free and is adapted to come against the end or head of the cylindrical chamber 16, when the main valve 7 and the valves 17 and 18 are operated and moved through a certain distance. The free end of this spring stops short of the bottom of the cylindrical chamber 16 and does not come against said bottom until the valves referred to have made a predetermined movement, which is at the end of the stroke for the ordinary service stops. If the pressure in the train-pipe 5 is reduced but slightly, which is the case in making ordinary service stops, the spring 23 will not be compressed, but its free end will come against the head of the chamber 16 only, and any further movement will be prevented by the spring. When, however, the pressure in the train-pipe is materially reduced, as in the case when emergency stops are to be made, the valve 7 and the pistons 17 18 will move the full limit of their stroke, compress the spring, as shown in Fig. 2, and control a second valve, to now be described, in a manner to be hereinafter set forth, and permit the air from both auxiliary reservoir and train-pipe to enter the brake-cylinder and put on the brakes instantaneously and with much force.

Communicating with the chamber 16 is a passage 24, which opens into another chamber 25, in the upper part of which plays a piston 26, arranged upon a stem 27, that carries a valve 28 at one end thereof, and has at the other end thereof a spring 29 for normally tending to keep said parts in their original position, as shown in Fig. 1. The valve-stem 27 may be provided with wings 30 to suitably guide the valve 28 in its play.

The valve 28 may be of any preferred form and construction.

My invention is not necessarily limited to a puppet-valve 28, for a piston-valve or other form of valve which will accomplish the same purpose I regard as within the spirit of my invention.

31 is a check-valve that is arranged opposite to the valve 28 and moves in an opposite direction thereto. It is provided with a spring 32 for tending to force said valve to its normal position. When the pressure in the train-pipe is materially reduced for an emergency stop, and the valve 28 withdrawn from its seat by the controlling influence of the pistons 17 and 18 to admit air from the train-pipe direct to the brake-cylinder, the pressure in the train-pipe and chamber 6 will force the check-valve 31 from its seat and allow the air in the train-pipe, as well as the air in the auxiliary reservoir, (by the simultaneous operation of the valve 11,) to enter the brake-cylinders. It may be here stated, however, that the air from the auxiliary reservoir enters the brake-cylinder a little before the valve 28 is unseated and just previous to the admission of air from the train-pipe to the brake-cylinder. Should the train become divided or the continuity of the train-pipe disrupted and communication open between the train-pipe and the brake-cylinder, as shown in Fig. 2, in the act of an emergency stop, the air from the brake-cylinder and auxiliary reservoir would pass back through the valve mechanism and escape, and to obviate this the check-valve 31 is provided.

It will be noted that the chamber 25 is in communication with the train-pipe by way of the port 20, the chamber 16, and the passage 24. The valve 28 is therefore held against its seat by the pressure in the train-pipe against the under side of the piston 26, supplemented by the aid of the spring 29, which is provided for the purpose of imparting a tendency to said valve to close. The pistons 17 and 18 are so arranged in the chamber 16 with reference to the exhaust-port 21 and the passage 24 that when the piston-valve 7 and said pistons 17 and 18 are moved through the full limit of their stroke, as in the case of emergency stops, communication will be afforded between the passage 24 and the exhaust 22 via the exhaust-port 21. This will exhaust the air from beneath the piston 26, and will thereby cause said piston to drop and depress the spring 29 by reason of the greater pressure upon the upper side of the piston 26, which is of larger area than the valve 28. The pressure in the train-pipe will now be exerted against the check-valve and force it from its seat, and thus open communication directly between the train-pipe and the brake-cylinder, as shown by the arrows in Fig. 2, communication between the auxiliary reservoir and the brake-cylinder having a short time before or simultaneously with this action been established. Thus the pressure of both the auxiliary reservoir and the train-pipe is thrown upon the brake-cylinder and the brakes put on with great force and rapidity. When the piston-valve 7 and the pistons 17 18 have moved their full stroke by reason of the pressure having been materially reduced in the train-pipe for an emergency stop, as shown in Fig. 2, and the pressure in the train-pipe is brought back to its original position, said pressure will be upon but one side of the piston-valve 7, and will cause it and the parts connected therewith to resume their normal position. This will move the valve 11 so as to exhaust the air from the brake-cylinder, as previously referred to, and the increase of pressure will force the pistons 17 and 18 up into their normal position (shown in Fig. 1) and open communication between the train-pipe and the chamber 25 beneath the piston 26 via the chamber 16, and thus lift said piston and the valve 28, and all the parts will then be in their normal position.

As at present arranged, the air will be compressed or imprisoned beneath said piston, and will thus aid the piston-valve 7 and the pistons 17 and 18 in resuming their normal positions. The only function of the passage or port 20 is to afford communication between the train-pipe and the passage 24 via the chamber 16, and it may therefore be arranged in any way to accomplish this purpose. The chamber 16 may communicate with the auxiliary reservoir instead of the train-pipe by means of the passage 33. (Shown in dotted lines.)

I am aware that valve mechanism for controlling an emergency stop through the instrumentality of the movement of a triple main valve has been designed heretofore; but in this previous construction the main valve is independent of the other valve and impinges against it in its excursion, whereas my valve is connected directly with the main valve and forms really a part thereof, and it does not of itself control the admission of air from the train-pipe to the brake-cylinders, but does this only through the instrumentality of another valve, which it controls.

I am aware that a valve for admitting air directly from the train-pipe to the brake-cylinder, which valve is held to its seat by the pressure in the train-pipe, is not broadly new, and particularly when operated by another valve which impinges against it, as these features are shown in Fig. 12 of patent to Westinghouse, No. 376,837, of January 24, 1888, and do not wish, therefore, to be understood as claiming the same broadly.

Having now fully described my novel valve devices for fluid-pressure automatic brake mechanism, what I desire to claim, and secure by Letters Patent of the United States as my invention, is—

1. The combination, in a fluid-pressure brake mechanism, of a main valve controlling the admission of air from the train-pipe to the auxiliary reservoir and governing the admission of air from the auxiliary reservoir to the brake-cylinder and also its eduction therefrom, a chamber 16, communicating with the chamber of the main valve, a piston-valve controlling the port between the train-pipe and brake-cylinder and having the train-pipe pressure exerted upon one side thereof through the main chamber of the valve mechanism and upon the other side thereof through ports communicating through the chamber 16, opening into the main chamber, said ports being controlled by the movement of the first-mentioned main valve, and a spring for imparting a tendency to said piston-valve to close communication between the train-pipe and the brake-cylinder.

2. The combination, in a fluid-pressure brake mechanism, of a main valve controlling the admission of air from the train-pipe to the auxiliary reservoir and governing the admission of air from the auxiliary reservoir to the brake-cylinder and also its eduction therefrom, a chamber 16, communicating with the main-valve chamber, a piston-valve operated by the main valve working therein, a spring secured at one end to said piston-valve and having its free end adapted to come against the head of said chamber 16 when the main valve is moved through a certain distance, and a second piston-valve having the train-pipe pressure exerted upon one side thereof through the main chamber of the valve mechanism and upon the other side thereof through ports communicating through the chamber 16, opening into the main chamber, said ports being controlled by the first-mentioned piston-valve.

In testimony whereof I have hereunto set my hand and affixed my seal, this 26th day of April, 1890, in the presence of two subscribing witnesses.

CHARLES K. PICKLES. [L. S.]

Witnesses:
A. C. FOWLER,
E. F. KELLY.